United States Patent
Knoblauch et al.

(10) Patent No.: US 10,278,525 B2
(45) Date of Patent: May 7, 2019

(54) DRINKING VESSEL COMPRISING A COMPENSATING BODY

(71) Applicant: IUVAS MEDICAL GMBH, Munich (DE)

(72) Inventors: Moritz Knoblauch, Munich (DE); David Fehrenbach, Munich (DE); Sinan Denemec, Munich (DE)

(73) Assignee: iuvas medical GmbH, Munich (DE)

( * ) Notice: Subject to any disclaimer, the term of this patent is extended or adjusted under 35 U.S.C. 154(b) by 26 days.

(21) Appl. No.: 15/526,863

(22) PCT Filed: Sep. 14, 2015

(86) PCT No.: PCT/DE2015/100392
§ 371 (c)(1),
(2) Date: Jun. 13, 2017

(87) PCT Pub. No.: WO2016/037614
PCT Pub. Date: Mar. 17, 2016

(65) Prior Publication Data
US 2017/0318994 A1    Nov. 9, 2017

(30) Foreign Application Priority Data

Sep. 13, 2014  (DE) .................... 20 2014 007 466 U
Sep. 18, 2014  (DE) .................... 20 2014 104 460 U (51) Int. Cl.
*B65D 77/06* (2006.01)
*A47G 19/22* (2006.01)
(Continued)

(52) U.S. Cl.
CPC ..... *A47G 19/2272* (2013.01); *A47G 19/2266* (2013.01); *G01F 23/2921* (2013.01);
(Continued)

(58) Field of Classification Search
CPC ........ A47G 19/22; B65D 85/72; B65D 25/34; B65D 77/06
(Continued)

(56) References Cited

U.S. PATENT DOCUMENTS

| 8,915,362 B2* | 12/2014 | Erickson ............ A61B 19/0262 206/366 |
| 2010/0084406 A1* | 4/2010 | Erickson ............ A61B 19/0262 220/557 |
| 2013/0112578 A1 | 5/2013 | Lemke et al. |

FOREIGN PATENT DOCUMENTS

| CN | 201360844 Y | 12/2009 |
| CN | 201510043 U | 6/2010 |

(Continued)

*Primary Examiner* — King M Chu
(74) *Attorney, Agent, or Firm* — Laurence A. Greenberg; Werner H. Stemer; Ralph E. Locher (57) ABSTRACT

A drinking vessel has a drink container with a body that compensates for changes in the liquid level in the drink container. The compensating body includes an elastic component which, under the influence of weight forces of a liquid volume, enlarges its shape, i.e. the volume of the compensating body. When the acting weight forces cease, the compensating body returns to a smaller original shape. There is no need for a sliding-movement-based sealing action of the compensating body in relation to the inner walls of the drink container. Therefore, the user does not have to first put the drink container down in order for the liquid level to stabilize.

22 Claims, 8 Drawing Sheets

(51) Int. Cl.
 *G01F 23/292* (2006.01)
 *A47G 19/12* (2006.01)
(52) U.S. Cl.
 CPC .. *A47G 2019/122* (2013.01); *A47G 2200/048* (2013.01); *B65D 2543/00509* (2013.01); *B65D 2543/00731* (2013.01)
(58) Field of Classification Search
 USPC .......................................................... 220/711
 See application file for complete search history.

(56) References Cited

FOREIGN PATENT DOCUMENTS

| | | |
|---|---|---|
| CN | 202104666 U | 1/2012 |
| CN | 203458152 U | 3/2014 |
| CN | 103948278 A | 7/2014 |
| CN | 203806423 U | 9/2014 |
| DE | 202004001835 U1 | 4/2004 |

* cited by examiner

Fig. 1

PRIOR ART

DRINKING VESSEL COMPRISING A COMPENSATING BODY

BACKGROUND OF THE INVENTION

Field of the Invention

The present invention relates to a drinking vessel [1] for receiving a liquid suitable for consumption, in particular a glass, a cup or a beaker, composed of a drink container [10] with a body [20] that compensates changes of the liquid level (S) in the drink container [10].

Many patients can tilt their head back only to a limited extent and, starting from a certain filling level, are no longer able to empty typical drinking vessels [1] such as cups, beakers or glasses. If a patient is able to tilt his head back and overextend it, there is a considerably increased risk of the contents being swallowed the wrong way, since the airways lie free. This circumstance is exploited in emergency situations, where the head is overextended in order to save life by freeing the airways.

However, in other everyday situations, for example when drinking from a beaker with a spout, overextension of the head poses a high risk of liquid entering the airways (so-called aspiration). In routine hospital practice, the phenomenon of swallowing the wrong way can be seen when a patient tries drinking from a conventional beaker with a spout. As can be generally observed in these situations, a person drinking from a conventional beaker with a spout has to tilt the head far back in order to empty the cup. For persons who also have dysphagia (difficulty swallowing) for example, the risk of aspiration is then extremely high. Moreover, most of the known beakers are also brightly colored, with the result that the liquid level is difficult to discern. It is also often observed that patients begin to suck, as when using a straw, as soon as they have tilted the beaker only slightly and when they still have no contact with the liquid. Aspiration is pre-programmed as a result of the drawing-in of air, the further tilting of the beaker and the simultaneous overextension of the head. The emptier the beaker gets, the more the person has to overextend the head. Consequently, this increases the risk of aspiration.

In most cases, the consequences of aspiration are inflammation of the lungs (pneumonia) and long periods of confinement to bed in hospitals. In young vital individuals, it is true that aspiration does not immediately trigger pneumonia, but hospital patients are nowadays often very elderly and/or have multiple medical conditions.

Conventional beakers with spout have to be tilted very sharply during the drinking process. If the liquid level (S) is only slightly below the standard measure (E) by Δh, tilting angles of 50° and more must already be expected (see FIG. 1).

However, conventional drinking aids, in particular for the very elderly and/or multimorbid patients and/or persons with dysphagia and/or associated aspiration, are largely limited to the modification of the shape of the drinking vessel. For example, DE 20 2004 001 835 U1 focuses on a drinking beaker which is intended to make complete draining of the liquid easier by virtue of a beveled wall. This is not a satisfactory solution. Instead, it would be desirable if the tilting angle could be limited to a minimum amount.

In persons who are sick and/or elderly, there are basically two main problems when it comes to drinking. On the one hand, the danger of aspiration increases the farther back the head is tilted. If a person with additional dysphagia attempts to completely empty a drinking vessel [1], the risk of aspiration increases considerably, since the head is continuously tilted farther back as the liquid level drops.

On the other hand, these persons may be restricted in terms of their freedom of movement, in such a way that complete draining of the drinking liquid is no longer possible. The natural drinking movement may no longer be performed satisfactorily, for example as a result of inadequate rotation of the wrist, arthrosis in the shoulder and neck region, or difficulty in tilting the head (cervical spine symptoms).

In healthcare facilities and also in domestic healthcare, it often happens that the persons concerned no longer completely empty the drinking vessel [1]. To prevent dehydration of the patients, the nursing staff frequently top up the liquid in the drinking vessels [1] such that the persons concerned can continuously take on liquid by drinking. A conventional drinking aid, for example the beaker with spout shown in FIG. 1, merely prevents spillage of the drinking liquid; it does not solve the essential problems mentioned above.

In order to avoid this, drinking vessels [1] of the type in question are disclosed, for example in CN 201510043 U or CN 202104666 U, which are composed of a drink container [10] with a body [20] that compensates changes of the liquid level (S). The known compensating bodies [20] have the disadvantage that they have to be designed to slide sealingly on the inner wall of the drink container [10], which is complicated per se and, depending on the design, can inhibit the ease of use and therefore the functionality of the compensating body [20], in particular when drinking with the vessel inclined. Thus, in tests carried out by the inventors, it has been found that a user first of all has to set the drink container [10] down so that a compensating body [20] designed with a sliding sealing action can settle the liquid level (S) again. A compensating body [20] with a sliding sealing action is also difficult to removed, if it is removable at all, which causes problems in terms of the recommended cleaning and, therefore, in terms of hygiene. A further disadvantage is that a dead volume arises when filling the drinking vessel [1], as a result of a compressible compensating body [20] in the drink container [10], said dead volume making the desired correct documentation of the imbibed liquid quantities difficult, in particular in the case of elderly and/or multimorbid users.

The object of the present invention is to make available a drinking vessel [1] that avoids the disadvantages known from the prior art.

BRIEF SUMMARY OF THE INVENTION

This object is achieved by a drinking vessel [1] having the features as claimed.

The drinking vessel [1] according to the invention for receiving a liquid suitable for consumption, composed of a drink container [10] with a body [20] that compensates changes of the liquid level (S) in the drink container [10] is characterized in that the compensating body [20] comprises an elastic component [21] which, under the weight forces (F) of a liquid volume, enlarges its shape, i.e. the volume of the compensating body [20], and which, when the acting weight forces (F) cease, returns the compensating body [20] to a smaller original shape.

Since the compensating body [20] comprises an elastic component [21] which itself enlarges the volume shape of the compensating body under the weight force (F) of a liquid volume, there is advantageously no need for a sliding sealing movement of the compensating body [20] relative to the inner walls [12] of the drink container [10]. Instead, when acting weight forces (F) cease, the compensating body [2] itself is returned to its smaller original shape. The user does not have to set the drink container [10] down so that the liquid level (S) can settle again.

Advantageous refinements and developments, which may be of relevance individually or in combination, are set out in the dependent claims:

Thus, in one development, the elastic component [21] of the compensating body [20] preferably has an elasticity that is dependent on the weight force (F) of the liquid volume. A compensating body [20] with an elastic component [21] dependent on the weight force (F) of the liquid volume has the advantage that it is able to keep the "water level" of the drinking liquid in the drink container [10] at a constant horizontal level during the drinking process.

According to the invention, the compensating body [20] is preferably designed as an insert body (designated below simply as "insert") for complete or partial insertion into the drink container [10]. A compensating body [20] designed as an insert is advantageously easier to remove and clean. In addition, a compensating body [20] designed as an insert has the advantage of being able to be retrofitted in drinking vessels [1] already in use.

A compensating body [20] with an elastic component [21] is therefore an essential part of drinking vessels [1] according to the invention. The underlying physical principle can be explained by the conversion of energy. When the drink container [10] is filled with liquid, the compensating body [20] preferably designed as an insert, namely the elastic component [21] thereof, changes its shape and is expanded or stretched, as a result of the weight force (F) of the liquid. When liquid is withdrawn from the drink container [10], the compensating body [20] compensates the resulting drop of the liquid level (S) by virtue of the fact that the compensating body [20] seeks to recover its original shape or its smaller original form. This is preferably realized by the potential energy stored in the elastic component [21]. This device, i.e. the compensating body [20] according to the invention, has the advantage that the drinking vessel [1] can be completely emptied at a much reduced tilting angle of only 5° to 20°, by comparison with a drinking vessel [1] without such a compensating body [20] designed as an insert.

The elasticity of the elastic component [21] is preferably realized by the elasticity of the material itself. For example, the elastic component [21] can preferably be an injection-molded part made from a polymer.

In developments of the invention, a compensating body [20] preferably designed as an insert has proven useful when composed wholly or partially of the following components: a floor-like component [23] and/or a wall-like elastic component [24/21] and/or a preferably collar-shaped fastening component [22], wherein a lid-like component [25] can preferably additionally be present. The components can be partially or wholly fused together, resulting in a continuous compensating body [20] designed as an insert. Moreover, the components can be made of one material or of different materials. In other words, the compensating body [20] designed as an insert can be made of one or more materials. Finally, the drinking vessel [1] can have a ventilation device [50] or ventilation opening. The subdivision into the various components has been made in order to facilitate understanding of the function of the compensating body [20] preferably designed as an insert.

According to the invention, a configuration is preferred in which ventilation grooves [51] are formed which begin on the inner wall [12] in the drink container [1] and engage over the mouth edge [14], which has the advantage, inter alia, that no ventilation grooves are needed in the compensating body [20], which in particular also makes it easier to produce from thin materials.

A compensating body [20] preferably designed as an insert according to this technical teaching preferably has a rotationally symmetrical design, for which reason the device, i.e. the drinking vessel [1] with compensating body [20], can advantageously also be used independently by elderly or sick patients and always only in the correct way.

Moreover, the fastening component [22] preferably has an annular configuration and is preferably connected to the drink container [10] by form-fit engagement, force-fit engagement or integral bonding, or the compensating body [20] preferably designed as an insert is preferably held in the drink container [10] in some other way, e.g. by a bead-like edge component [26].

The fastening component [22] can preferably be connected to the upper edge of the drink container [10] or is preferably connected to an upper area of the inner wall [12] of the drink container [10].

Preferably, the elastic component [21], the fastening component [22], the floor-like component [23], the wall-like elastic component [24/21] and/or preferably also the lid-like component [25] are made of one material, such that the compensating body [20] preferably designed as an insert is obtainable with a "condom-like" structure, which enhances the simplicity and also the cost effectiveness this configuration. Such a compensating body [20] preferably designed as an insert of one material can be made, for example, from a polymer, for example silicone or a thermoplastic elastomer. The compensating body [20] thus obtainable, with for example a condom-like structure, additionally has the advantage than, during filling with a liquid suitable for consumption, it is able to expand into any randomly structured interior [11] of a drink container [10] without leaving an appreciable dead volume therein, which advantageously facilitates the correct documentation of imbibed quantities of liquid in particular in the case of elderly and/or multi-morbid users.

The drink container [10] of the drinking vessel [1] can be connected to the compensating body [20], preferably designed as an insert, by force-fit engagement, form-fit engagement and/or integral bonding. Preferably, the compensating body [20] can be connected to the upper edge, the upper wall [12], of the drink container [10]. For example, the drink container [10] with the associated compensating body [20] can also be produced in one manufacturing process, preferably by injection molding.

In a preferred development, the documentation of imbibed quantities of liquid can be further improved by a sensor element (60) which calculates changing quantities of liquid in the compensating body [20]. Such a sensor element [60] advantageously permits IT-based, semi-automated or fully automated documentation of the quantities of drink imbibed by patients, for example in the health records of a hospital management system. In addition, information such as reminders and/or acknowledgements to the nursing personnel or to the patients themselves, in particular via an app, are also conceivable.

The drinking vessel [1] according to the invention is described in more detail below on the basis of drawings and illustrative embodiments. The embodiments are given merely as examples and are not to be regarded as exhaustive. The features of the drinking vessel [1] can be used individually or in combination.

DESCRIPTION OF THE INVENTION

In the following description of preferred embodiments of the present invention, identical reference signs designate identical or comparable components.

Figure 1:
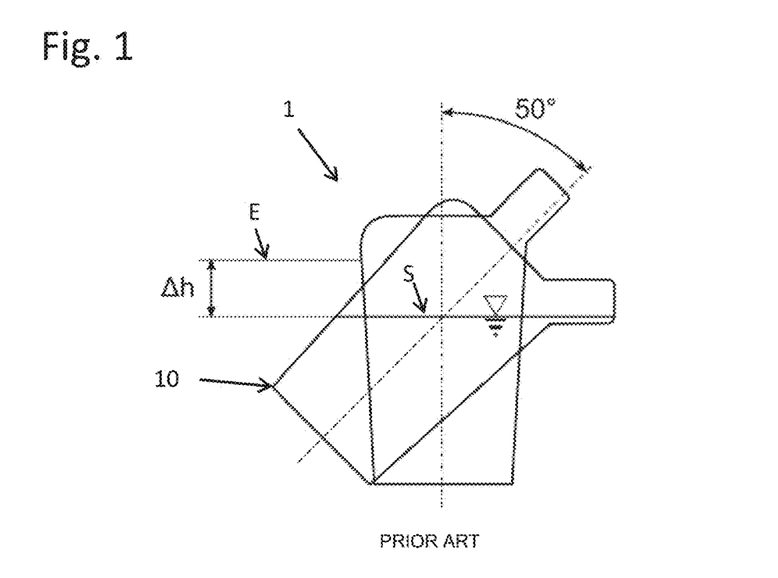
FIG. 1 shows a cup with spout known from the prior art.

FIG. 1 shows a cup with spout known from the prior art, and of a kind already explained in detail in the introductory part of the description.

Figure 2:
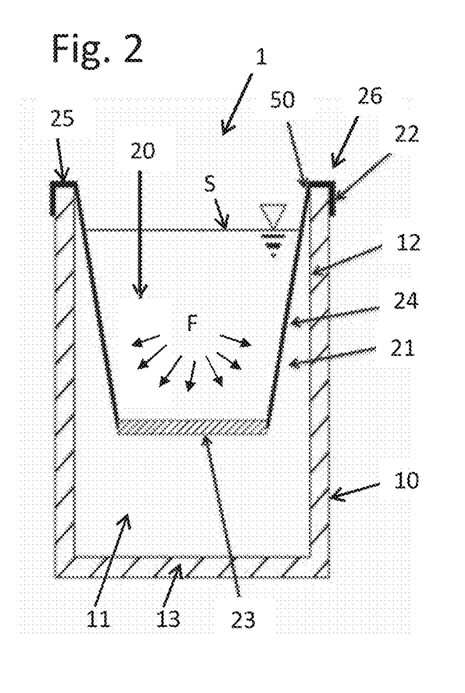
FIG. 2 shows a first embodiment of a drinking vessel [1] according to the invention in a side view.

FIG. 2 shows a side view of a first drinking vessel 1 according to the invention, composed of a drink container 10 and of a compensating body 20 which is preferably designed as an insert and which can be fitted completely or partially in the drink container 10.

Figure 5:
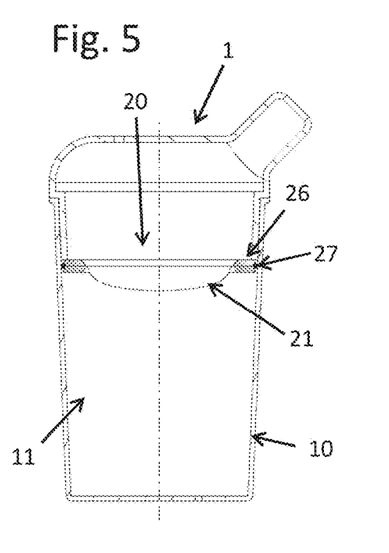
FIG. 5 shows the drinking vessel [1] analogous to FIG. 2 in the empty state.
Figure 6:
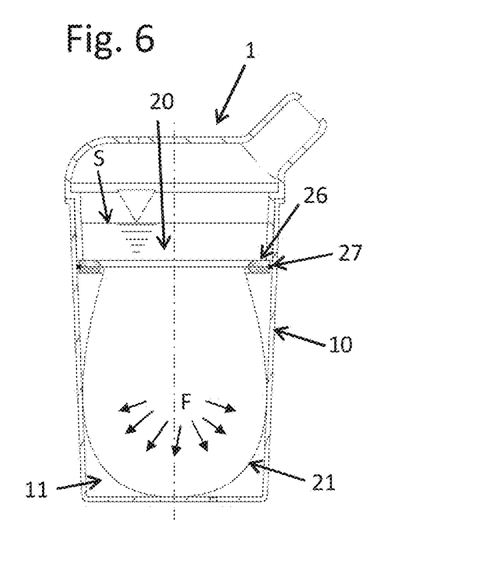
FIG. 6 shows the drinking vessel [1] from FIG. 5 in a filled state.
Figure 7:
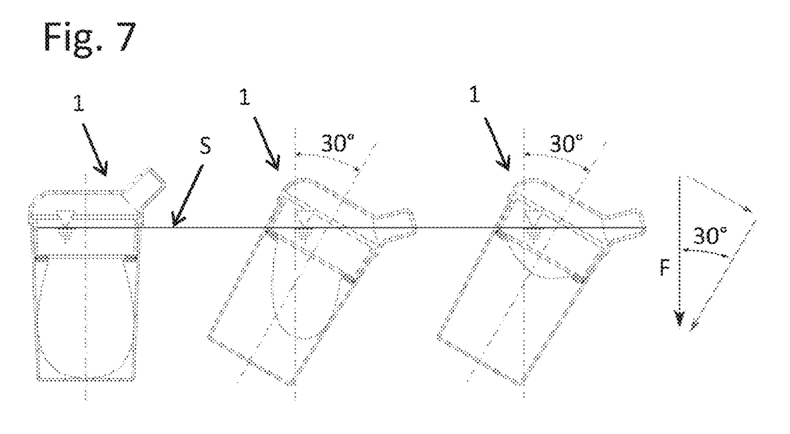
FIG. 7 shows the illustrative embodiment from FIGS. 5 and 6 in further positions of use.

As is shown in FIG. 2, the compensating body 20 preferably designed as an insert can have a floor-like component 23 and also a fastening component 22, wherein the latter can preferably be connected to the drink container 10 by force-fit engagement, form-fit engagement or integral bonding. As is shown for example in FIGS. 5 to 7, the compensating body 20 preferably designed as an insert can be fixed in the drink container 10 with force-fit engagement by means of an interference fit between the fastening component 22 and the drink container 10. The elastic component 21, which can at the same time also completely form (as shown in FIG. 2) or partially form (not shown) the wall-like component 24 or, as is shown in FIGS. 5 to 7, can at the same time also completely or partially form the floor-like component 23, is located vertically between the floor-like component 23 and a lid-like component 25. A ventilation device 50 connects the interior 11, created by the compensating body 20 preferably designed as an insert, to the ambient air, such that air can flow into and out of the interior 11 as soon as the compensating body 20 changes its shape.

FIG. 2 thus shows a first embodiment of a drinking vessel 1 according to the invention with a compensating body 20 which is preferably designed as an insert, and of which the fastening component 22 is connected to the upper mouth edge 14, or to the upper area of the inner wall 12 of the drink container 10. This connection can be provided by force-fit engagement, form-fit engagement or integral bonding.

It will be seen from the side view in FIG. 2 that the compensating body 20 preferably designed as an insert has a circumferential annular edge component 26. In the first illustrative embodiment here, the elastic component 21 and the wall-like component 24 are also "fused" to give one component. The transition from the fastening component 22 and the wall-like elastic component 24/21 to the floor-like component 23 is preferably continuous in its design. In the area of transition of the fastening component 22 to the wall-like elastic component 24/21, a ventilation opening 50 is provided, particularly such that the latter is located above the liquid level S designated by a triangular symbol. The present illustrative embodiment, shown in FIG. 2, of a compensating body 20 preferably designed as an insert can be made completely or partially of a polymer, for example a thermoplastic elastomer, and can be produced cost-effectively by conventional injection molding.

When the drink container 10 shown in FIG. 2 is filled with liquid, the elastic component 21 is tensioned. In the present example, the elastic component 21 (at the same time forming the wall-like component 24), the fastening component 22, the floor-like component 23, the lid-like component 25 and the ventilation device 50 can be made from one and the same material.

Furthermore, the fastening component 22 is preferably connected by form-fit engagement to the upper mouth edge 14, or to the upper area of the inner wall 12 of the drink container 10. The transition from the fastening component 22 and the wall-like elastic component 24/21 to the floor-like component 23 is preferably continuous, wherein the components 22, 24/26, 23 can be made from a polymer. It is thus recommended that the compensating body 20 preferably designed as an insert be produced by injection molding.

Figure 3:
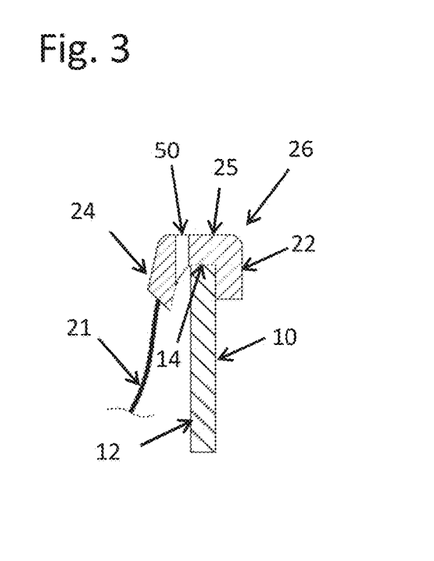
FIG. 3 shows an enlarged view of the ventilation device [50] or ventilation opening, with reference to the illustrative embodiment according to FIG. 2.

FIG. 3 shows an enlarged schematic view of the ventilation device 50 or ventilation opening mentioned above with reference to FIG. 2. It will be seen how the elastic component 21 is able to attach itself to the wall-like component 24. The ventilation device 50 or ventilation opening is to be provided in the upper area of the compensating body 20 preferably designed as an insert or in or near, i.e. adjacent to, the lid-like component 25 of the compensating body 20 preferably designed as an insert, such that the ventilation opening 50 is always above the liquid level S. It will be appreciated that the ventilation device 50 or ventilation opening is preferably formed in the fastening component 22 in such a way that liquid cannot get into the interior 11 of the drink container 10 or the person drinking cannot close off the ventilation with his mouth.

Figure 4:
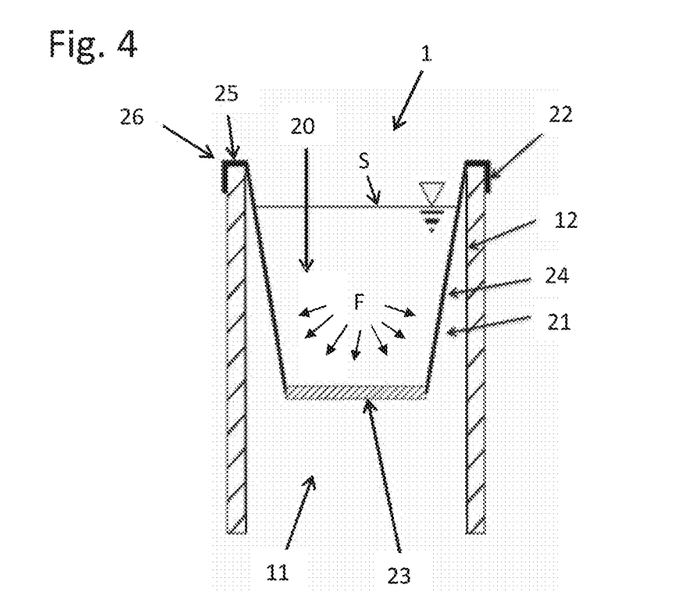
FIG. 4 shows a second embodiment of a drinking vessel [1] according to the invention in a side view, similar to the one in FIG. 1 but produced in one piece.

FIG. 4 shows a second embodiment of a drinking vessel 1 according to the invention, composed of a drink container 10 which is designed according to this technical teaching and which has a body 20 that compensates changes of the liquid level S in the drink container 10, wherein the drink container 10 in FIG. 4 has, compared to the drink container 10 from FIG. 2, an open floor. In this way, the drink container 10 and the compensating body 20 can be produced by integral bonding, for example by injection molding, preferably two-component injection molding, in one manufacturing step, and without the need for a ventilation device 50 or ventilation opening, since the interior 11 is always in contact with the ambient air via the open floor of the drink container 10. The elastic component 21 of the compensating body 20 is preferably designed such that, upon sufficient filling of the compensating body 20 and lifting of the drinking vessel 1, this compensating body 20 does not protrude from the floor opening of the drink container 10.

FIG. 5 shows the drinking vessel 1 analogous to FIG. 2 in the empty state. It shows how the drinking vessel 1 can be a conventional beaker with spout (see FIG. 1), in which a compensating body 20 designed as an insert is arranged. In this illustrative embodiment, the compensating body 20 designed as an insert is connected via a circumferentially annular edge component 26 to the inner wall 11 of the drink container 10 of the beaker with spout by force-fit engagement, for example with an interference fit obtained by means of a sealing ring or O-ring 27. The elastic material 21 extending toward the center represents the elastic component 21 of this embodiment. In FIG. 5, the drinking vessel 1 is shown in an empty state, i.e. not filled with liquid.

FIG. 6 shows the drinking vessel 1 from FIG. 5 in a state when filled with liquid suitable for consumption. It shows how the elastic component 21 of the compensating body 20 designed as an insert is loaded and shaped by the weight F of the liquid volume, wherein the elastic component 21 extends into the cavity or interior 11 of the drink container 10 of the beaker with spout.

FIG. 7 shows the illustrative embodiment according to FIG. 5 and FIG. 6 in further positions of use. A compensating body 20, which is preferably designed as an insert and preferably imitates a "condom-like" structure, compensates for the loss of liquid via its elasticity and thus compensates for the drop of the liquid level S. The liquid suitable for consumption (comparable to water in terms of its density) expands the compensating body 20 designed as an insert. When the volume is reduced by drinking, the resulting lower weight F of the liquid volume frees the return of the compensating body 20 to its original shape again. Moreover, the component of the weight force F acting on the elastic component 21 and therefore on the compensating body 20 is reduced by the tilt angle (triangle of forces). The liquid level S additionally rises, and the tilt angle required for drinking is reduced again.

Figure 8:
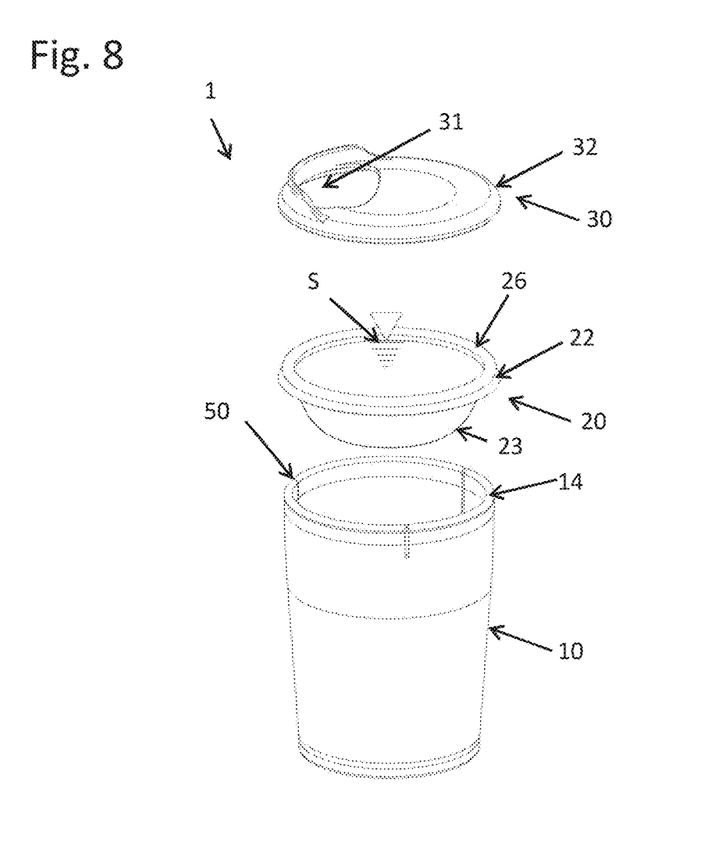
FIG. 8 shows a third embodiment of a drinking vessel [1] according to the invention in a perspective exploded view, comprising a drink container [10], a compensating body [20] preferably designed as an insert, and a lid element [30] covering same.

FIG. 8 shows a perspective exploded view of a third embodiment of a drinking vessel 1 according to the invention, with a drink container 10, a compensating body 20 preferably designed as an insert, and a lid element 30 which covers the latter and in which a mouth opening 31 ergonomically shaped for the human mouth is preferably formed. It will be appreciated that the mouth opening 31 can also be configured individually, or mouth openings 31 already provided can be adapted.

The fastening component 22 and the adjoining lid-like component 26 are preferably designed to correspond fully or partially to the upper mouth edge 14 of the drink container 10, such that these preferably permit a form-fit connection of the compensating body 20, preferably designed as an insert in this illustrative embodiment, to the drink container 10.

The lid element 30 in turn has a lid edge 32 designed to correspond fully or partially to the fastening component 22 or to the lid-like component 25 adjoining the latter, which lid edge 32 permits a form-fit connection of the lid element 30 to the compensating body 20 preferably designed as an insert.

The form-fit connections have the advantage of permitting simple and reversible assembly and disassembly of drink container 10, compensating body 20 and lid element 30, for example for cleaning purposes.

Figure 9:
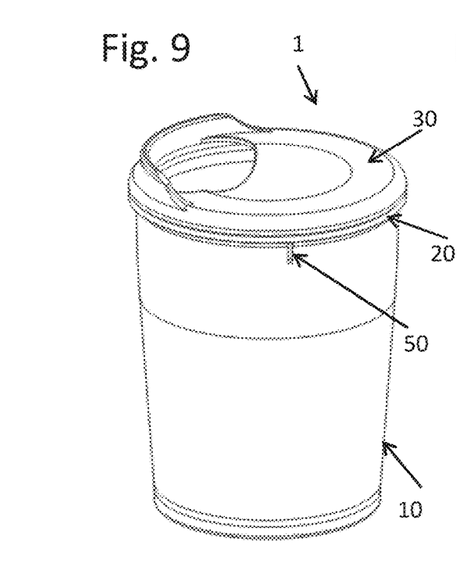
FIG. 9 shows the illustrative embodiment from FIG. 8 in a state in which it is connected by form-fit engagement and covered with a lid element [30]

FIG. 9 shows the embodiment according to FIG. 8 in a view in which it has been connected by form-fit engagement and is covered with a lid element 31.

In addition, form-fit connections also make it possible, instead of the lid element, for a closure element 40 to be placed with form-fit engagement onto the fastening component 22 or onto the lid-like component 25 adjoining the latter, whereby a drinking vessel 1 is made available that can advantageously also be used on the move. An example of a "to-go" drinking vessel 10 is shown in FIG. 10, in respect of which it will be noted by way of precaution that closure elements 40 of this design are of course also conceivable (not shown) which also secure the lid element 30 and mouth opening 31.

Figure 10:
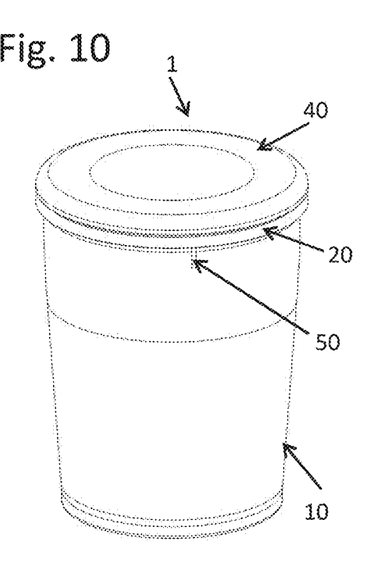
FIG. 10 shows the illustrative embodiment analogous to FIG. 9 in a state in which it is connected by form-fit engagement and covered with a closure element [40]
Figure 11:
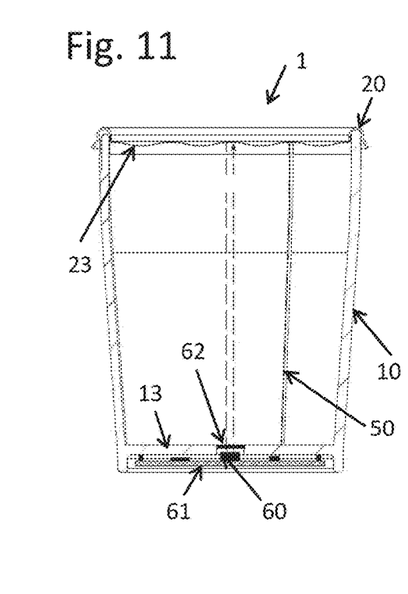
FIG. 11 shows the embodiment illustrated in FIGS. 8 to 10, with the addition of a sensor [60] which is arranged in the container floor [13] of the drink container [10] and serves to calculate changing liquid levels (S) in the drink container [10], on the basis of an empty drink container.

In FIG. 11, the embodiment depicted in FIGS. 8 to 10 is shown with the addition of a sensor element 60 arranged in the container floor 13 of the drink container 10, which sensor element 60 calculates changing liquid levels (S) in the drink container 10 on the basis of an empty drink container 10.

Figure 12:
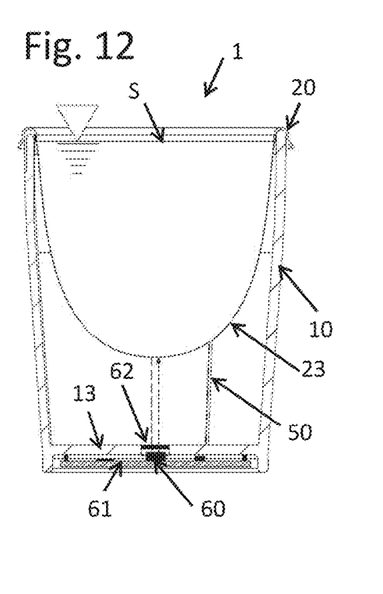
FIG. 12 shows the embodiment from FIG. 11 on the basis of a partially filled drink container 10.

FIG. 12 shows the embodiment from FIG. 11 in the case of a partially filled drink container 10.

A human being can survive for about one month without eating, but for at most five to seven days without drinking. Therefore, for human health, drinking a correct and sufficient amount of liquid each day is at least as important as correct nutrition.

The human body is about two thirds water. Water is a tasteless and odorless, transparent and colorless liquid made up of two hydrogen atoms (H) and one oxygen atom (O). Water serves, on the one hand, as a transport medium, for example for blood, urine and perspiration, and also, on the other hand, as a solvent for almost all substances in the human cell.

Water additionally regulates the temperature of the body, since it draws heat from the organism by surface evaporation (perspiration). The human body eliminates large quantities of liquid each day. To maintain an optimal level of liquid, these losses have to be repeatedly compensated. Some of the liquid required is obtained through food. In addition, adults should drink about 2 liters of water a day.

Although the human body is able to some extent to compensate for lack of water through concentration processes, a liquid deficit then damages the human organism.

Since water is also a main constituent of the blood, the latter is no longer able to flow correctly if not enough water is taken in. The supply of blood to the whole body decreases and brain function and concentration deteriorate. With insufficient levels of liquid, there is also an increased danger of kidney stones and of urinary infections or obstructions, and the skin and mucous membranes also dry out, so that viruses and bacteria then find it easier to enter the body.

Scientific studies have shown that a water loss of just 2% of body weight considerably reduces performance levels. Attention should therefore be paid to the warning signals from the body: headache, nausea, dry mouth, thirst, or also loss of appetite.

Just as a human being ages over the course of his or her life, the system of swallowing also changes. The ability to swallow can be maintained and exercised by drinking regularly. However, most adults drink too little each day. This habit increases with age and can lead to serious problems: dryness of the mucous membranes, tooth loss, muscle deterioration, and stiffening of the mandibular joints can lead to lack of coordination of the swallowing reflex. The problem is sometimes made worse by pre-existing dysphagia, or by the onset of dysphagia, and, in the persons affected, there is a danger of aspiration and, consequently, a danger of pneumonia.

The quantities of liquid given in particular to very old and/or multi-morbid individuals are documented in a usually handwritten drink protocol. Despite this, or even because of it, it is sometimes very difficult for nursing personnel or care providers to be certain that very old and/or multi-morbid individuals are getting the quantity of liquid that they need. Changes resulting from the aging process, for example a reduced sense of thirst, can be compensated by well-oriented persons. However, very old and/or multi-morbid individuals often lack this ability and they are no longer able to motivate themselves to drink. The motivation therefore has to come from the nursing personnel or care providers.

In view of the above, a partial problem addressed by the present invention is that of making available a drinking vessel 1 that avoids the disadvantages known from the prior art, either in conjunction with the compensating body 20 or independently of the latter.

A drinking vessel 1 solving this partial problem, and receiving a liquid suitable for consumption, is characterized by a drink container 10 with a sensor element 60 for calculating changes of liquid levels S in the drink container 10.

In one development, it is proposed that the sensor element 60 is part of an electronic or mechatronic system 61 (hereinbelow electronic system, abbreviated to ES).

Integrated in this way, the sensor element 60 is able to deliver the acquired data, preferably via an interface, to peripheral appliances for example, which may differ from each other depending on the area of application and which, if appropriate, may also be part of a hospital management system for example.

The ability to evaluate the data within a peripheral appliance has the advantage is that the complexity of the system 61 can be kept as low as possible.

As is shown in FIGS. 11 and 12, it is preferable to arrange the sensor element 60, or the system 61 comprising the latter, in the container floor 13 of the drinking container 10.

According to the invention, it has proven preferable to use a sensor element 60 that is an infrared-based distance meter. An infrared impulse is emitted which is reflected by the liquid in the drink container 10, on the liquid surface or on the lower surface of the compensating body 20, and is sent back again to the sensor element 60. The sensor element 60 measures the time needed for this travel and calculates the filling level from this. Here, the reflectance of the surface need only be 3%. Since the measurement is carried out by infrared, the density of the liquid is also irrelevant in terms of a correct measurement.

There are in principle two scenarios in which the system can be used:

The use with the compensating body 20 designed as an insert, and the use in a drink container 10 without such a compensating aid. In the former use, the liquid medium is located on the side directed away from the sensor element 60. By contrast, in the scenario without the insert, the IR impulse runs through the liquid medium.

Figure 13:
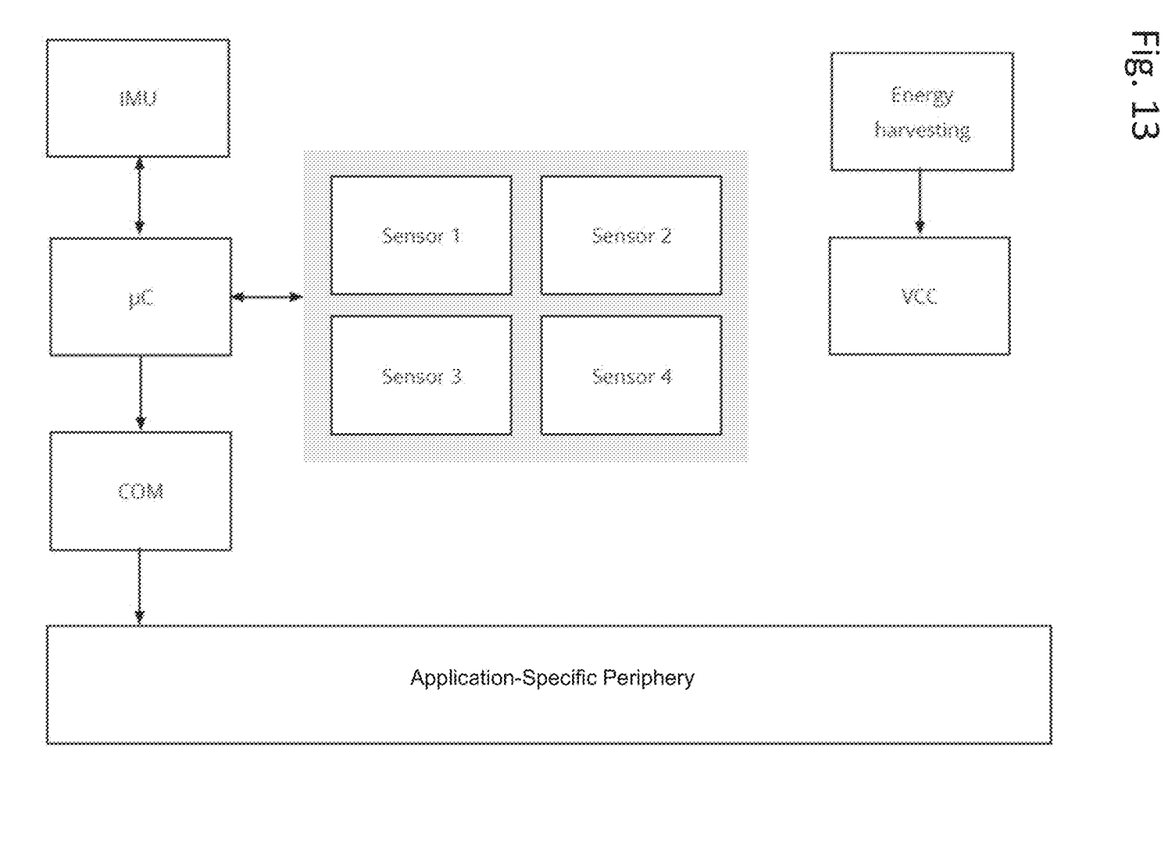
FIG. 13 shows a circuit diagram of an electronic or mechatronic system [61] comprising the sensor [60] from FIG. 11.

FIG. 13 shows a circuit diagram of an electronic or mechatronic system 61 that comprises the sensor element 60 from FIGS. 11 and 12.

As can be seen from this, further sensors can be used alternatively or cumulatively:

Triangulation sensors measure distances via the reflection angle at the interface. By means of a photodiode array, the site of incidence of the reflected light impulse is determined and is converted to the distance of the interface.

Ultrasound sensors are also conceivable in principle. They measure according to the same principle as the IR sensor.

Magnetic and inductive sensors could be of interest for one or other product variant and could then be secured to an outer wall of the drink container 10.

The system 61 is composed of at least of a sensor element 60, a voltage supply (VCC), a microcontroller (µC) and a communications interface (COM).

In order to transmit and evaluate the acquired data, a communications interface is needed. The latter may expediently be in the form of a radio connection. This advantageously avoids the need to attach the system 61 to the desired peripheral by means of a wire connection.

A connection may preferably be set up via WLAN, mobile radio, direction radio, Bluetooth or RFID.

A suitable filter is chosen in order to eliminate sensor-side measurement noise. If traditional filter designs fail, it is proposed to operate a plurality of sensors in order to be able to smooth a signal by means of a stochastic filter.

In order to exclude incorrect interpretation of disturbances arising from the environment, e.g. the carrying or shaking of the drinking vessel 10, it is proposed that an acceleration sensor (IMU) be provided which only takes account of events that occur within a defined inclination of the container.

The drinking vessel 10, with or indeed without integrated sensors, is preferably dishwasher-safe and waterproof. Therefore, in one development, a suitable encapsulation of the electronic components 60, 61 is proposed. Since this rules out the possibility of battery exchange, an alternative is proposed in the form of so-called energy harvesting.

Further possibilities for sustained operation of products according to the invention are conceivable through piezoelectric, thermoelectric and/or photoelectric effects.

In the first-mentioned method, movement is converted into electricity by means of piezoceramics. Energy can thus be obtained when the drinking vessel 1 is moved. Possible movements occur, for example, when the vessel 1 is being carried or when it is shaken.

Electrical energy can likewise be obtained by temperature differences. If one considers that temperatures of up to 90° C. are reached in a commercial dishwasher, this method assumes importance in particular in commercial use in hospitals or care homes. It is thus conceivable that, by daily washing of the drink container 10 in a dishwasher, a supply of current can be maintained to the sensor element 60 and/or the electronic or mechatronic system 61.

Depending on the application area, different interaction concepts may be formulated, for which reason a number of peripheral appliances are described in brief below:

For hospitals and care homes, the data can expediently be fed directly into the electronic patient files. This does away with the need for documentation, which saves an enormous amount of time. Patient safety can also be increased in this way. If the amount that is required to be drunk is not complied with, a warning can be output, for example, on the ward manager's monitor.

A wristband, which receives and evaluates the acquired data from the system 61, may be an interaction concept that is of interest especially for the private user and for care at home. For example, the wristband can then be used to provide a direct warning or reminder. A solution adapted to a specific age of patient is likewise conceivable.

However, it would also be expedient, for the private user, to ensure compatibility here with the commercially available fitness bands and the like. This can be achieved in particular in cooperation with leading manufacturers.

In addition to use for care at home or for outpatient care, a reasonable concept would be for the data to be made available by email or web interface. In this way, relatives could receive an email each evening detailing the amount drunk that day. Health visitors could also log into a web interface, in particular by means of a password, and download the acquired data.

Finally, direct communication to a smartphone or tablets by means of an app and for example Bluetooth ought to be of interest not only to private users.

A drinking vessel 1 for receiving a liquid suitable for consumption, composed of a drink container 10 with a sensor element 60 for calculating changing liquid levels S in the drink container 10, is equally suitable for uses in hospitals and care homes and in outpatient care and domestic care, and also for private users.

If we ask ourselves how much liquid we have taken in since our morning coffee, the answer is often that it was too little. Businessmen, students, kindergarten teachers, physicians, long-distance truck drivers or construction workers are just a small selection from a circle of users having one thing in common: a busy and varied daily routine that is stressful and, above all, is not carried out in one location. In these circumstances, drinking is often just forgotten about.

The preferred drinking vessel 1 according to the invention remedies this situation since it makes available a lifestyle product that reminds and encourages the user to take on liquid.

Figure 14:
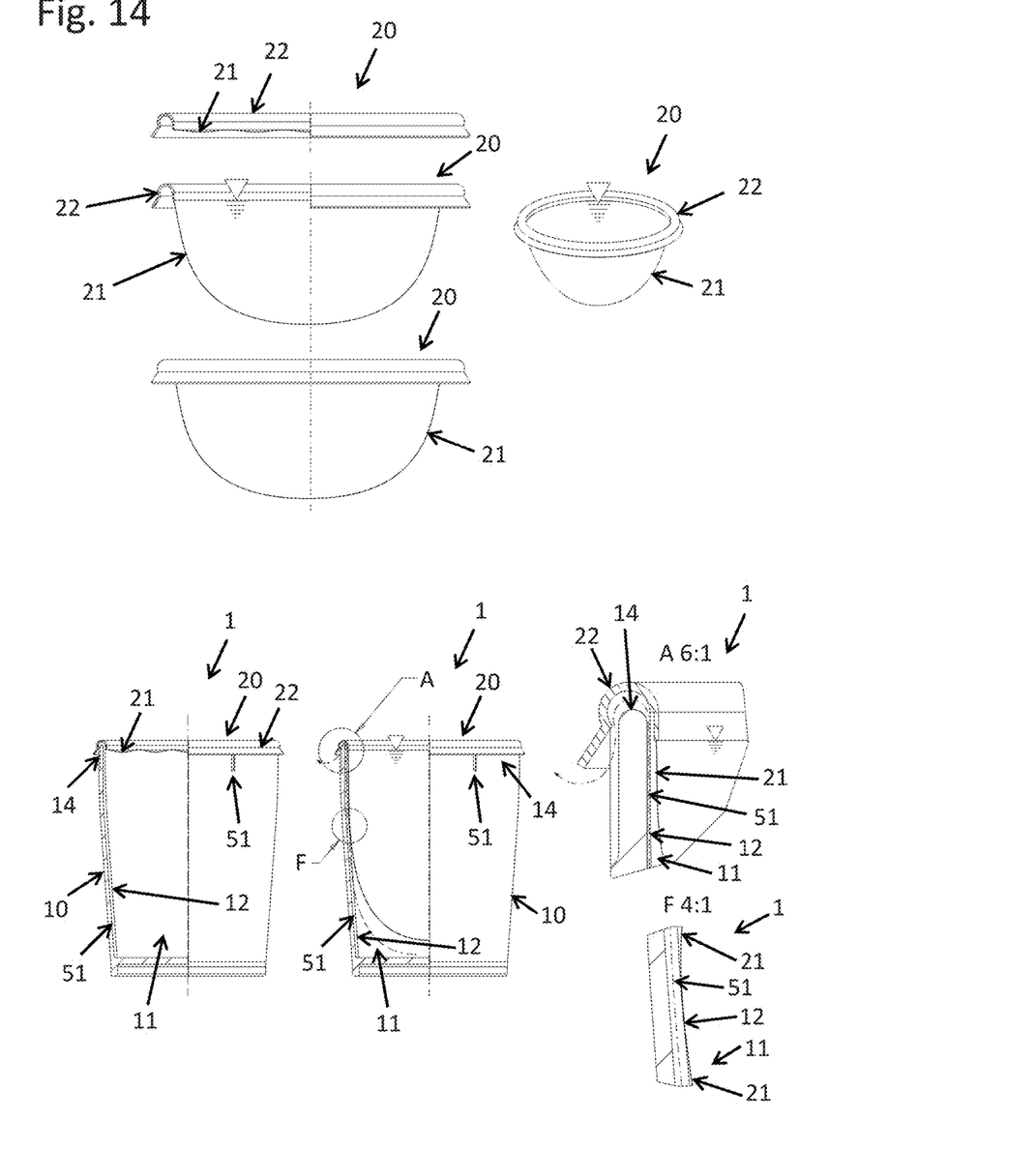
FIG. 14 shows a first ventilation concept [A] for ventilation of the embodiment depicted in FIGS. 8 to 12.

FIG. 14 shows a first ventilation concept [A] for ventilation of the embodiment described with reference to FIGS. 8 to 12.

In the upper half of the figure, the compensating body 20 is shown in different views, filling states and partial cross sections. The view at the top left shows the compensating body 20 in a half-sectioned side view in an unfilled state, wherein the elastic component 21 of the compensating body is connected to the fastening component 22.

The middle view on the left shows the compensating body 20 in a half-sectioned side view in a filled state, wherein the elastic component 21 of the compensating body is connected to the fastening component 22.

The view at the bottom left shows the compensating body 20 in a side view in a filled state, wherein the elastic component 21 of the compensating body is connected to the fastening component 22.

The compensating body 20 filled with a liquid suitable for consumption can be seen on the right, along with the fastening component 22 and the elastic component 21.

In the lower half of the figure, on the left-hand side, an unfilled drinking vessel 1 according to the invention, configured according to the ventilation concept [A], is shown in a half-sectioned side view, with a drink container 10, a compensating body 20 preferably designed as an insert and composed of fastening component 22 and elastic component 21, and also ventilation grooves 51 which serve to ventilate the interior 11 of the drink container 10 and which extend from the inner wall of the drink container 12 across the mouth edge of the drink container 14 to the outer wall of the drink container. Thus, during the filling process and drinking process, the air in the interior 11 of the drink container 10 is able to escape through the ventilation grooves 51.

In the middle view, a filled drinking vessel 1 according to the invention is shown in a half-sectioned side view, with a drink container 10, a compensating body 20 preferably designed as an insert, and also ventilation grooves 51 which serve to ventilate the interior 11 of the drink container 10 and which extend from the inner wall of the drink container 12 across the mouth edge of the drink container 14 to the outer wall of the drink container. The dot-and-dash line indicates the flow of the air out of the interior 11 of the drink container 10.

The view at the top right shows the detail A of the drinking vessel 1 from the middle view in cross section. The dot-and-dash line indicates the flow of the air from the interior 11 of the drink container 10 through the ventilation groove 51, which extends from the inner wall 12 of the drink container 10 across the mouth edge 14 of the drink container 10 to the outer wall of the drink container 10. The compensating body 20, composed of the fastening component 22 and of the elastic component 21, is connected to the mouth edge 14 of the drink container 10 by form-fit engagement.

The view at the bottom right shows the detail F of the drinking vessel 1 from the middle view in cross section. This focuses on the fact that the elastic component 21 of the compensating body 20 can nestle onto the inner wall of the drink container 12 during the filling process. Despite this, the ventilation groove 51 allows air to escape from the interior 11 of the drink container 10.

Figure 15:
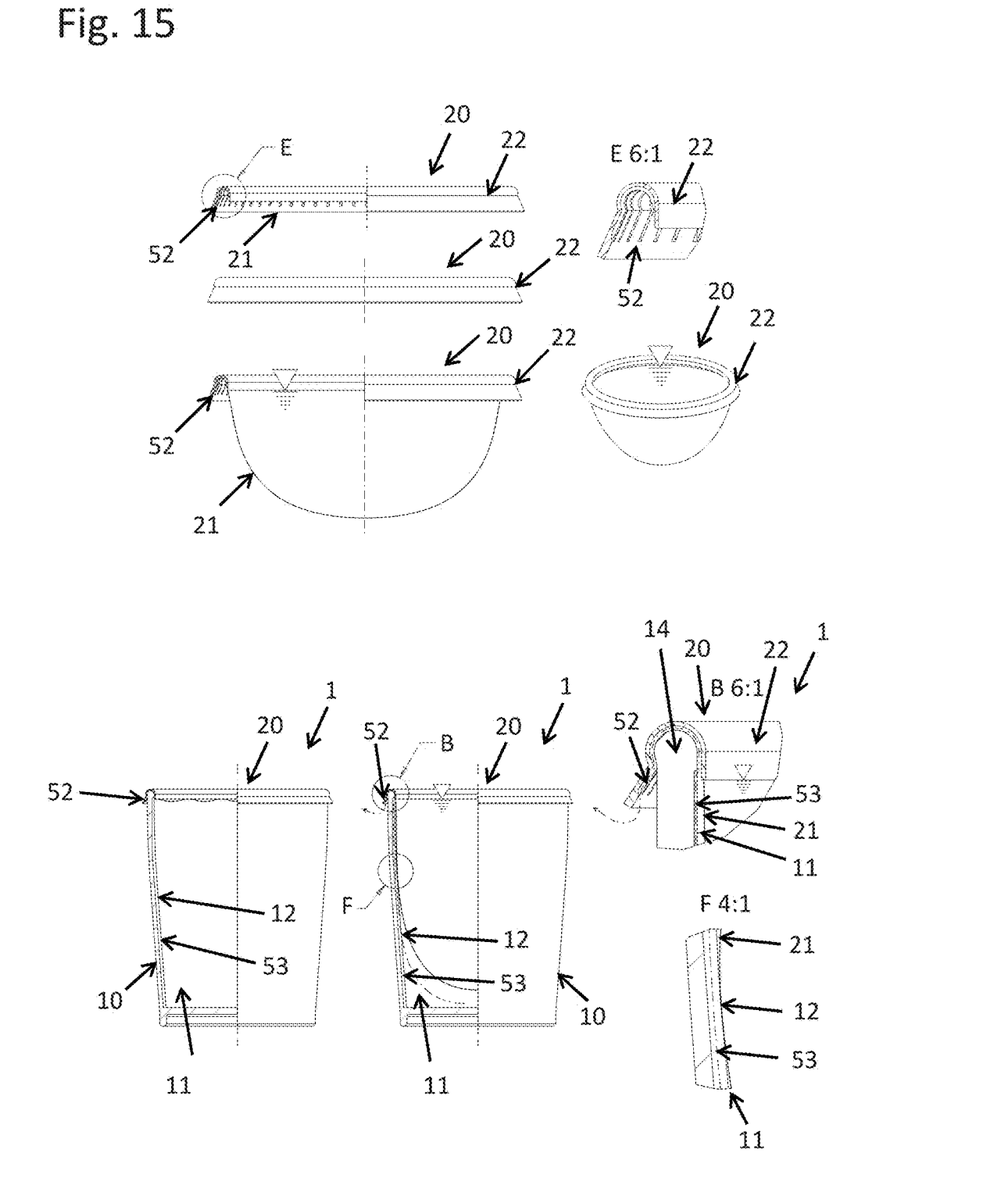
FIG. 15 shows a second ventilation concept [B] for ventilation of the embodiment depicted in FIGS. 8 to 12.

FIG. 15 shows a second ventilation concept [B] for ventilation of the embodiment described with reference to FIGS. 8 to 12.

In the upper half of the figure, the compensating body 20 is shown in different views, filling states and partial cross sections. The view at the top left shows the compensating body 20 in a half-sectioned side view in an unfilled state, wherein the elastic component 21 of the compensating body is connected to the fastening component 22. Moreover, ventilation grooves of the fastening component 52 can be seen on the underside of the fastening component 22. The view at the top right shows the detail E in which, in a cross section, the ventilation grooves of the fastening component 52 can be seen on the underside of the fastening component 22.

The middle view on the left shows the compensating body 20 in a half-sectioned side view in an unfilled state, wherein only the fastening component 22 can be seen.

The view at the bottom left shows the compensating body 20 in a half-sectioned side view in a filled state, wherein the elastic component 21 of the compensating body is connected to the fastening component 22. Moreover, the ventilation grooves of the fastening component 52 can be seen.

The view at the bottom right is a perspective view showing the compensating body 20 composed of the fastening component 22 and of the elastic component 21 in the partially filled state.

In the lower half of the figure, on the left-hand side, an unfilled drinking vessel 1 according to the invention, configured according to the ventilation concept [B], is shown in a half-sectioned side view, with a drink container 10, a compensating body 20 preferably designed as an insert, and also ventilation grooves of the inner wall of the drink container 53 which serve to ventilate the interior 11 of the drink container 10 and which are formed only on the inner wall 12 of the drink container 10, as a result of which the air in the interior 11 of the drink container 10 can escape through the ventilation grooves of the fastening component 52 and through the ventilation grooves 53 of the inner wall 12 of the drink container 10 during the filling process and drinking process.

In the middle view, a filled drinking vessel 1 according to the invention is shown in a half-sectioned side view, with a drink container 10, a compensating body 20 preferably designed as an insert, and also ventilation grooves 53 of the inner wall 12 of the drink container 10 which serve to ventilate the interior 11 of the drink container 10 and which are formed only on the inner wall 12 of the drink container 10. The air can thus escape through the ventilation grooves 53 of the inner wall 12 of the drink container 10 and then through the ventilation grooves 52 of the fastening component 22. The dot-and-dash line indicates the flow of the air out of the interior 11 of the drink container 10.

The view at the top right shows the detail B of the drinking vessel 1 from the middle view in cross section. The dot-and-dash line indicates the flow of the air from the interior 11 of the drink container 10 through the ventilation grooves 53 of the inner wall 12 of the drink container 10 and through the ventilation grooves 52 of the fastening component 22. The compensating body 20, composed of the fastening component 22 and of the elastic component 21, is preferably connected to the mouth edge 14 of the drink container 10 by form-fit engagement.

The view at the bottom right shows the detail F of the drinking vessel 1 from the middle view in cross section. This focuses on the fact that the elastic component 21 of the compensating body 20 can nestle onto the inner wall 12 of the drink container 10 during the filling process. Despite this, the ventilation groove 53 of the inner wall 12 of the drink container 10 allows air to escape from the interior 12 of the drink container 10.

Figure 16:
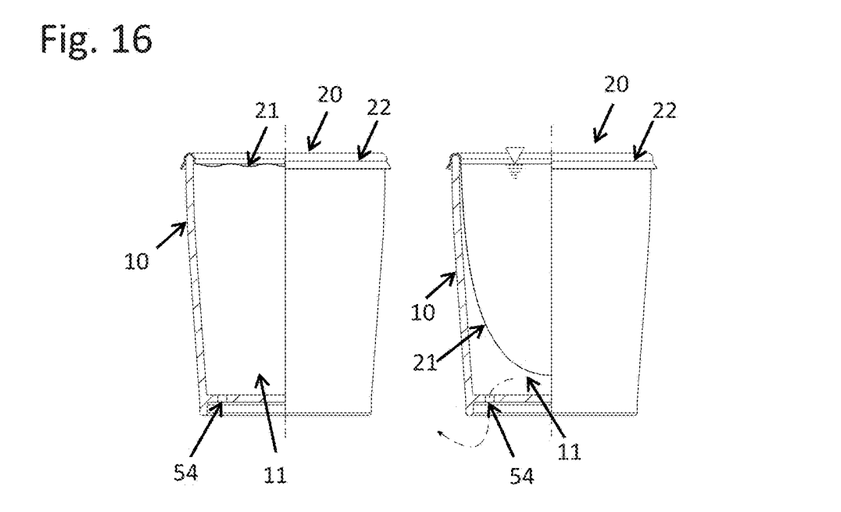
FIG. 16 shows a third ventilation concept [C] for ventilation of the embodiment depicted in FIGS. 8 to 12.

FIG. 16 shows a third ventilation concept [C] for ventilation of the embodiment described with reference to FIGS. 8 to 12. It shows the drink container 10 with the compensating body 20 attached with form-fit engagement (empty on the left; filled on the right) in partially sectioned front views. It will be seen how the air in the interior 11 of the drink container 10 is able to escape through the ventilation opening 54 in the container floor 13 of the drink container 10 during the filling process and drinking process. Moreover, the elastic component 21 and the fastening component 22 of the compensating body 20 can be seen.

Figure 17:
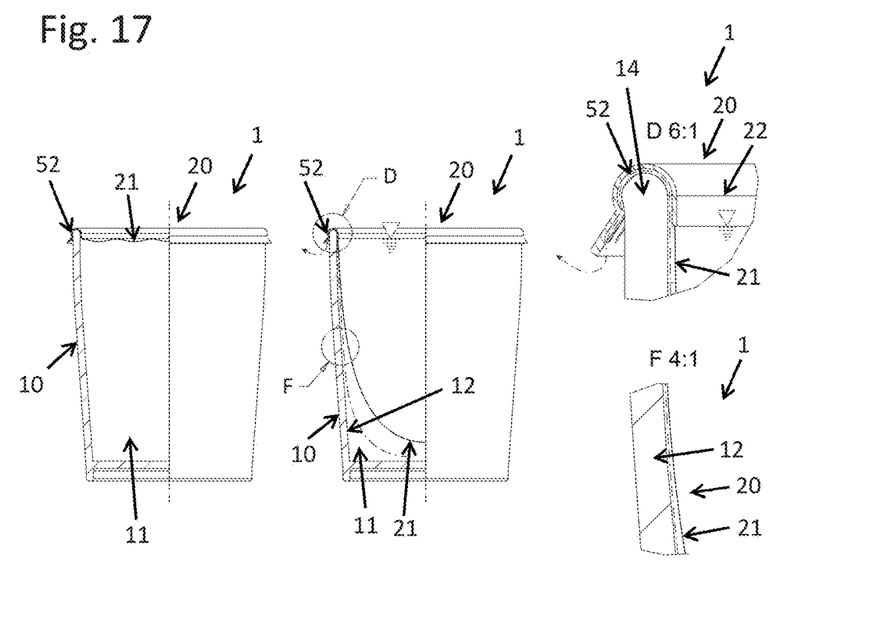
FIG. 17 shows a fourth ventilation concept [D] for ventilation of the embodiment depicted in FIGS. 8 to 12.

FIG. 17 shows a fourth ventilation concept [D] for ventilation of the embodiment described with reference to FIGS. 8 to 12. It shows the drink container 10 with a compensating body 20 attached by form-fit engagement (empty on the left; filled on the right).

On the left-hand side, an unfilled drinking vessel 1 according to the invention, configured according to ventilation concept [D], is shown in a half-sectioned side view, with a drink container 10, a compensating body 20 preferably designed as an insert, and also ventilation grooves 52 of the fastening component 22 which serve to ventilate the interior 11 of the drink container 10.

In the middle view, a filled drinking vessel 1 according to the invention is shown in a half-sectioned side view, with a drink container 10, a compensating body 20 preferably designed as an insert, and also ventilation grooves 52 of the fastening component 22 which serve to ventilate the interior of the drink container 11. The air can thus escape from the interior of the drink container 11 if the elastic component 21 of the compensating body 20 does not nestle hermetically on the inner wall 12 of the drink container 10. The dot-and-dash line indicates the flow of the air out of the interior 11 of the drink container 10.

The view at the top right shows the detail D of part of the drinking vessel 1 from the middle view in cross section. The dot-and-dash line indicates the flow of the air from the interior 11 of the drink container 10 through the ventilation grooves 52 of the fastening component 22. The compensating body 20, composed of the fastening component 22 and of the elastic component 21, is connected to the mouth edge 14 of the drink container 10 by form-fit engagement.

The view at the bottom right shows the detail F of part of the drinking vessel 1 from the middle view in cross section. This focuses on the fact that the elastic component 21 of the compensating body 20 does not nestle onto the inner wall 12 of the drink container 10 during the filling process. Thus, circumferential ventilation grooves 51, as shown in FIG. 14, or ventilation grooves 53 of the inner wall 12 of the drink container 10, as shown in FIG. 15, are not necessary for ensuring the ventilation. Here, the ventilation grooves 52 of the fastening component 22 are sufficient for the ventilation.

A compensating body 20 preferably designed according to the invention as an insert has the advantage that it counteracts the lowering of the liquid level S during the drinking process, such that overextension of the neck of the person drinking is advantageously avoided, along with the swallowing difficulties often associated with overextension, and the drinking vessel 1 can also be completely emptied by elderly and sick persons.

LIST OF REFERENCE SIGNS 1 drinking vessel
10 drink container
11 interior of the drink container 10
12 inner wall of the drink container 10
13 container floor of the drink container 10
14 mouth edge of the drink container 10
20 compensating body, in particular designed as an insert
21 elastic component of the compensating body 20
22 fastening component
23 floor-like component
24 wall-like component
25 lid-like component
26 edge component
27 sealing ring or O-ring
30 lid element
31 mouth opening in the lid element 30
32 lid edge
40 closure element
50 ventilation device
51 ventilation grooves
52 ventilation grooves of the fastening component
53 ventilation grooves of the inner wall 12 of the drink container 10
54 ventilation opening in the container floor 13 of the drink container 10
60 sensor
61 electronic or mechatronic system
62 viewing window in the container floor 13 of the drink container 10

E standard measure
F weight force of a liquid volume
S liquid level

The invention claimed is:

1. A drinking vessel for receiving a liquid suitable for consumption, the drinking vessel comprising:
    a drink container;
    a compensating body in said drink container for compensating for changes of a liquid level in said drink container;
    said compensating body having an elastic component and a fastening component affixing said elastic component to said drink container;
    said elastic component, under a weight force of a liquid volume, enlarging a shape of said compensating body, and, when the weight force of the liquid volume ceases, returning said compensating body to a smaller, original shape.

2. The drinking vessel according to claim 1, wherein said elastic component of the compensating body has an elasticity that is dependent on the weight force of the liquid volume.

3. The drinking vessel according to claim 1, wherein said compensating body is an insert for complete or partial insertion into said drink container.

4. The drinking vessel according to claim 1, wherein an elasticity of said elastic component is defined by an elasticity of a material thereof.

5. The drinking vessel according to claim 1, wherein said compensating body is an insert formed of a plurality of components selected from the group consisting of said elastic component, a collar-shaped fastening component, a floor component, and an elastic wall component, and said components are formed of a common material, of different materials or of a combination of different materials.

6. The drinking vessel according to claim 5, which further comprises a ventilation device or a ventilation opening.

7. The drinking vessel according to claim 5, which further comprises a lid component.

8. The drinking vessel according to claim 1, wherein said drink container is formed with ventilation grooves which begin on an inner wall in said drink container and engage over a mouth edge.

9. The drinking vessel according to claim 1, wherein said compensating body has a rotationally symmetrical design.

10. The drinking vessel according to claim 1, wherein said fastening component is a circumferential annular edge of said compensating body and/or is connected to said drink container by form-fit engagement, force-fit engagement or integral bonding.

11. The drinking vessel according to claim 1, wherein said fastening component is connected to an upper edge of said drink container or to an upper area of an inner wall of said drink container.

12. The drinking vessel according to claim 5, wherein said elastic component, said fastening component, said floor component, said elastic wall component, and an optional lid component are formed of a common material, to enable said compensating body to obtain a balloon-shaped structure.

13. The drinking vessel according to claim 1, wherein said compensating body is an insert connected to said drink container by an attachment mechanism selected from the group consisting of frictional engagement, form-fit engagement, and integral boding.

14. The drinking vessel according to claim 1, which further comprises a sensor element for calculating changing quantities of liquid.

15. The drinking vessel according to claim 14, wherein said sensor element forms a part of an electronic or mechatronic system.

16. The drinking vessel according to claim 15, wherein said sensor element or said system containing said sensor element is arranged in a container floor of said drink container.

17. The drinking vessel according to claim 14, wherein said sensor element is disposed in a container floor of said drink container.

18. The drinking vessel according to claim 14, wherein said sensor element is an infrared-based distance measuring sensor.

19. A drinking vessel for receiving a liquid suitable for consumption, the drinking vessel comprising:
    a drink container;
    a compensating body in said drink container for compensating for changes of a liquid level in said drink container, said compensating body being an insert for complete or partial insertion into said drink container;
    said compensating body having an elastic component which, under a weight force of a liquid volume, enlarges a shape of said compensating body, and which, when the weight force of the liquid volume ceases, returns said compensating body to a smaller, original shape.

20. A drinking vessel for receiving a liquid suitable for consumption, the drinking vessel comprising:
    a drink container having an inner wall and a mouth edge, said drink container being formed with ventilation grooves which begin on said inner wall in said drink container and engage over said mouth edge;
    a compensating body in said drink container for compensating for changes of a liquid level in said drink container;
    said compensating body having an elastic component which, under a weight force of a liquid volume, enlarges a shape of said compensating body, and which, when the weight force of the liquid volume ceases, returns said compensating body to a smaller, original shape.

21. A drinking vessel for receiving a liquid suitable for consumption, the drinking vessel comprising:
    a drink container;
    a compensating body in said drink container for compensating for changes of a liquid level in said drink container;
    said compensating body having a rotationally symmetrical design;
    said compensating body having an elastic component which, under a weight force of a liquid volume, enlarges a shape of said compensating body, and which, when the weight force of the liquid volume ceases, returns said compensating body to a smaller, original shape.

22. A drinking vessel for receiving a liquid suitable for consumption, the drinking vessel comprising:
    a drink container;
    a compensating body in said drink container for compensating for changes of a liquid level in said drink container;
    said compensating body having an elastic component which, under a weight force of a liquid volume, enlarges a shape of said compensating body, and which, when the weight force of the liquid volume ceases, returns said compensating body to a smaller, original shape; and a sensor element for calculating changing quantities of liquid.

* * * * *